United States Patent

[11] 3,614,571

| [72] | Inventor | Albert F. Koch<br>Lanesboro, Mass. |
|---|---|---|
| [21] | Appl. No. | 784,096 |
| [22] | Filed | Dec. 16, 1968 |
| [45] | Patented | Oct. 19, 1971 |
| [73] | Assignee | General Electric Company |

[54] LINEARIZATION OF A DIGITAL PHASE CONTROL POWER AMPLIFIER FOR DYNAMO ELECTRIC MACHINE
13 Claims, 6 Drawing Figs.

[52] U.S. Cl. ........................................... 318/345,
                                                318/308, 330/127
[51] Int. Cl. ........................................... H02p 5/10
[50] Field of Search ............................... 318/20.430,
       331, 341, 345, 338, 308, 327; 330/127, 132

[56] References Cited
UNITED STATES PATENTS
3,515,971  6/1970  Joslyn ........................... 318/308

| 2,858,495 | 10/1958 | Shrider | 318/331 |
| 3,149,270 | 9/1964 | Smyth | 318/20.430 |
| 3,242,407 | 3/1966 | Hansen | 318/20.430 X |
| 3,419,777 | 12/1968 | Asseo | 318/338 |

*Primary Examiner*—Oris L. Rader
*Assistant Examiner*—Thomas Langer
*Attorneys*—James C. Davis, Jr., Edward W. Goebel, Jr., Frank L. Neuhauser, Oscar B. Waddell and Melvin M. Goldenberg ABSTRACT: A digital motor control system compensates for the nonlinearity due to operation from a sinusoidal AC power source. A digital error signal is fed through a variable gain digital amplifier whose characteristics are such that the gain varies so as to correct for the nonlinearities which normally result. The output of the variable gain digital amplifier is used to directly control the transfer of power as, for example, by initiating the conduction of controllable rectifiers. The variable gain digital amplifier acts to vary the gain at two different rates, the second rate being less than the first by some factor of two.

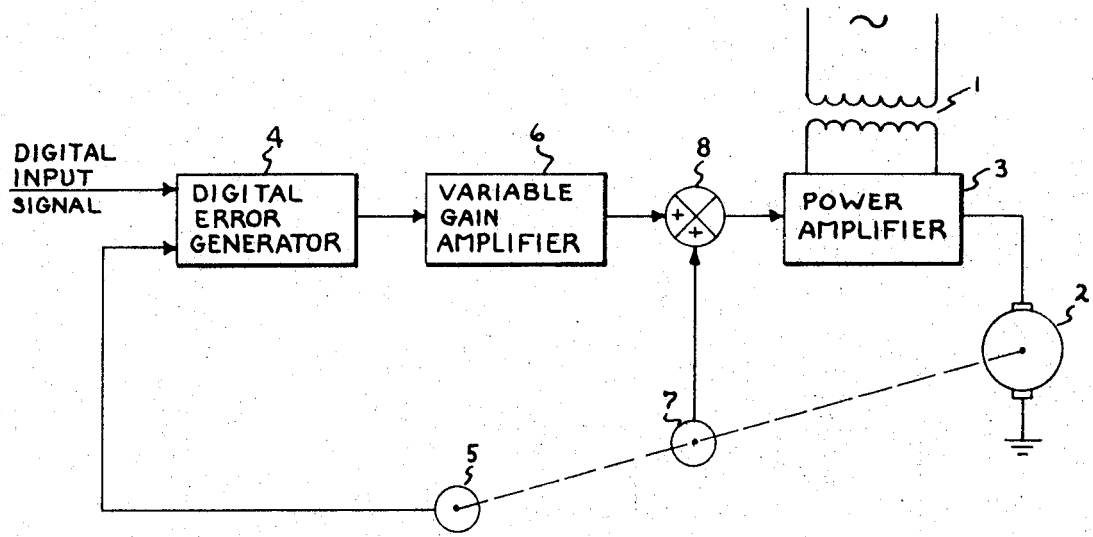
FIG. I
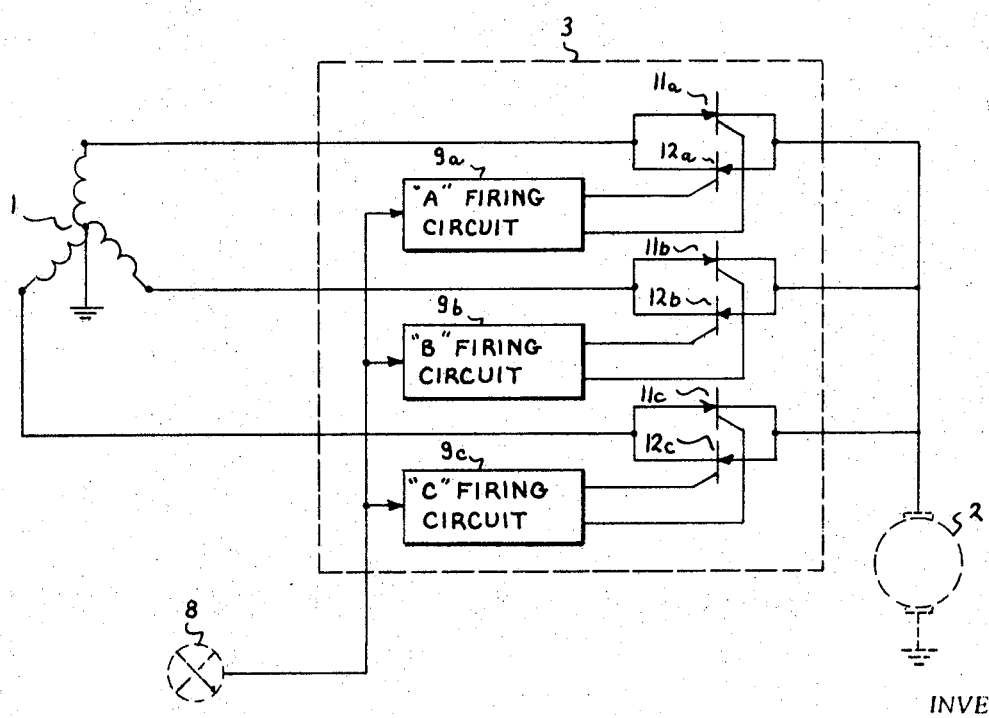
FIG. IA
INVENTOR.
ALBERT F. KOCH

3,614,571

LINEARIZATION OF A DIGITAL PHASE CONTROL POWER AMPLIFIER FOR DYNAMO ELECTRIC MACHINE

BACKGROUND OF THE INVENTION

The present invention pertains to motor control systems. More specifically, the invention relates to a linearized phase control power amplifier for use in a motor control system.

DC motor control systems of the prior art have operated from AC sources by way of controllable rectifiers such as thyratrons, SCR's, etc. The amount of power transferred to the controlled motor has been varied by varying the firing angle at which the controllable rectifier is caused to conduct. Such systems, however, are essentially nonlinear since the relationship between the firing angle and the power transferred is nonlinear. This nonlinearity is caused by the sinusoidal wave shape of the AC source plus the effects of motor back EMF. And, as a result of this nonlinearity, such systems have been somewhat difficult to stabilize, particularly where a wide control range is desired. As a result, it has been necessary to decrease system gain so as to assure stability throughout the range. Such a reduction in gain is, of course, accompanied by a corresponding reduction in system accuracy.

This sacrifice of accuracy is particularly troublesome in motor control systems which utilize digital techniques. The primary advantage of digital control is the high accuracies which can be achieved but the overall accuracy of prior art digital systems has heretofore been limited by the inherent nonlinearities referred to above.

Systems of the prior art have made some attempts to compensate for these inherent nonlinearities but such efforts have been primarily directed toward compensating for the effects of motor back EMF, usually by inserting a positive feedback signal proportional to motor speed.

SUMMARY OF THE INVENTION

It is an object of the present invention to provide a highly accurate digital control system.

It is a further object of the present invention to compensate for the inherent nonlinearities in a digital control system which operates from a sinusoidal AC source.

It is a still further object of the present invention to compensate for the nonlinearities due to the sinusoidal AC source in a digital motor control system.

Briefly stated, the present invention contemplates a method of, and apparatus for, modifying a digital error signal before using it to control the firing angle of controllable rectifiers interposed between an AC source and a motor being controlled.

BRIEF DESCRIPTION OF THE DRAWINGS.

While the specification concludes with claims particularly pointing out and distinctly claiming the subject matter which is regarded as the invention, the specifications may be referred to for an illustration of a particular embodiment. The drawings which accompany and augment these specifications are:

FIG. 1 a block diagram of a preferred embodiment of a system utilizing the present invention;

FIG. 1a a detailed drawing of the power amplifier of FIG 1;

FIG. 3b a simplified two-step linear approximation similar to FIG. 3a;

DESCRIPTION OF THE PREFERRED EMBODIMENT

Figure 2:
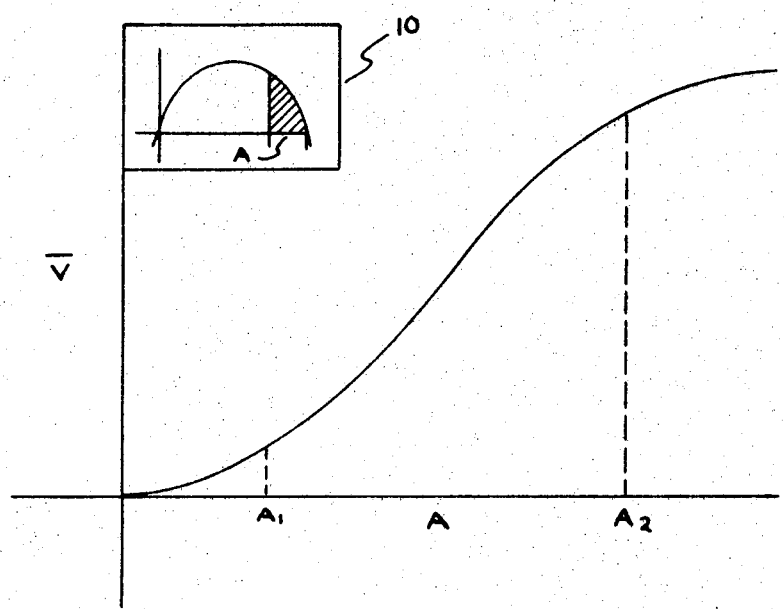
FIG. 2 a graphical representation of the relationship between average voltage and firing angle when a controllable rectifier conducts from an AC source.

Turning now to FIG. 1 there is shown in block diagram form the digital motor control system embodying the present invention. The system of FIG. 1 operates to transfer power from an AC source such as transformer 1 to a load such as DC motor 2 utilizing a power amplifier 3 to control the amount of power thus transferred. The power amplifier 3 may consist, for example, of a plurality of controllably rectifiers, such as thyratrons or SCR's, and their associated firing circuits. The system operates in response to a digital input signal which forms one input to a digital error generator 4. The other input to digital error generator 4 is some type of digital feedback such as the output of a digital or pulse tachometer 5, connected directly to the motor being controlled. In conventional systems of the prior art, the output of digital error generator 4 would be fed directly to the power amplifier 3 so as to command the conduction of the controllable rectifiers at a particular firing angle which is directly proportional to the digital error signal.

The system of the present invention, however, also provide a variable gain digital amplifier 6 which acts to correct for the nonlinearity which results from operating the system for a nonlinear i.e., sinusoidal wave shape. The output of variable gain amplifier 6 is fed into a summing point 8 which has as its second input a positive feedback signal from a feedback device 7 which generates a signal proportional to the speed of the motor being controlled. If, for example, the output of the variable gain amplifier is converted to an analog signal, then the output of feedback device 7 will also be an analog signal. Under these conditions feedback device 7 may comprise a conventional analog voltage tachometer. As has been pointed out, the systems nonlinearity due to motor back EMF results from, and is directly proportional to, the motor velocity. Hence, this nonlinearity is easily compensated by providing a feedback signal indicative of motor speed.

The system of FIG. 1, therefore, compensates for the inherent nonlinearities in the system thereby operating at higher gains and increased accuracy.

Turning now to FIG. 1a, there is shown in detail a particular embodiment of the power amplifier 3 of FIG. 1. The output of the summing point 8 is fed to firing circuits 9a, 9b, and 9c which, in turn, control the conduction of controllable rectifiers such as SCR's 11a, 11b, 11c, 12a, 12b, 12c. The controllable rectifiers are connected between an AC supply such as transformer 1 and the controlled motor 2. Any of the well-known types of firing circuits may be used, providing they operate so as to fire the controllable rectifiers at a firing angle which is directly proportional to the magnitude of the output of the summing point 8.

Turning now to FIG. 2, there is shown the relationship between the average voltage $\overline{V}$ and the firing angle $a$ which results when a controllable rectifier is caused to conduct from an AC source. In the insert 10 of FIG. 2 there is shown one-half of a sinusoidal wave with the shaded portion indicating the period of conduction which results from firing a controllably rectifier at a firing angle, $a$. As can be seen from FIG. 2, the relationship of average voltage to firing angle is approximately linear in the interval from firing angle $a_1$ to firing angle $a_2$. However, for firing angles less than $a_1$ or greater than $a_2$, the relationship has a markedly different slope. Hence, the relationship between average voltage and firing angle is not only nonlinear but exhibits marked differences at each end of the curve. It is this nonlinearity which the present invention seeks to compensate. If all other nonlinearities in the system are compensated, then the system gain varies according to the relationship set forth in FIG. 2.

Figure 3A:
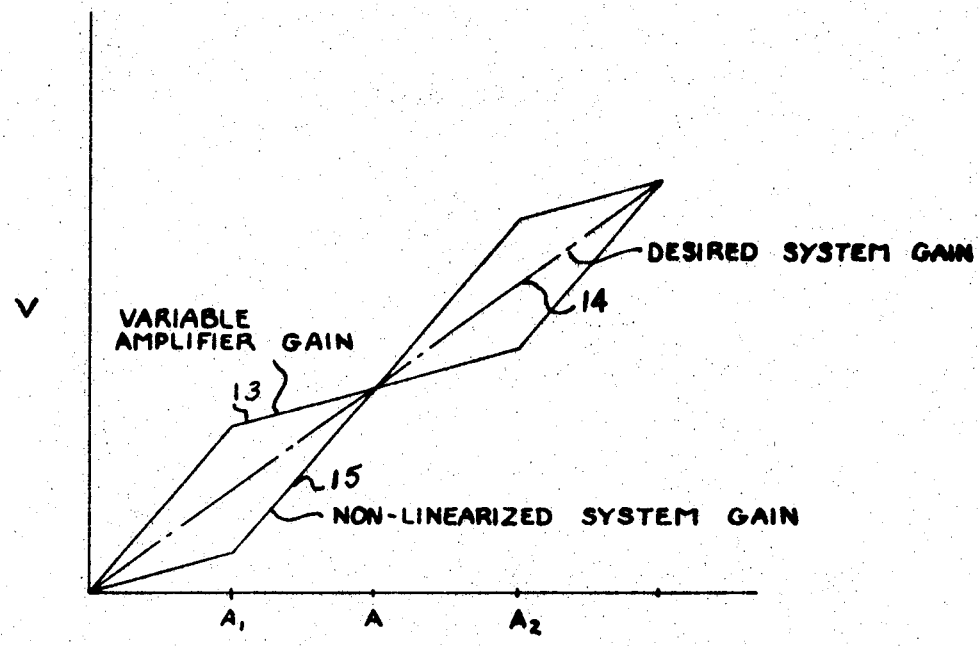
FIG. 3a a three-step linear approximation of the relationship of FIG. 2 including the desired characteristics of a variable gain digital amplifier to linearize system gain.

Turning now to FIG. 3a, there is shown a linear approximation of the nonlinearized system gain shown in FIG. 2. The desired system gain is, of course, the straight line 14 since it is the purpose of the present invention to make the relationship between firing angle and average voltage a linear relationship. An examination of curves 13 and 14, shows that to compensate for the inherent nonlinearity so as to yield a linear system gain, it is necessary to have the gain of the compensating amplifier follow the curve 15 in FIG. 3a. Thus, during the interval from 0 to $a_1$, the gain of the variable amplifier should follow the first portion of curve 15. From firing angles between $a_1$ and $a_2$, the gain of the variable amplifier is substantially reduced and finally for all firing angles in excess of $a_2$ the gain is once again increased. The combination of the inherent nonlinearity shown in curve 15 of FIG. 3a with the variably gain digital amplifier characteristics shown by curve 13 results in a linear relationship yielding the desired system gain as indicated by the straight line 14. Hence, in order to implement this particular function it is necessary to have a variable amplifier which is capable of generating different gains over the three intervals shown. Such a variable amplifier would have a first gain during the interval from 0 to $a_1$, a second gain during the interval from $a_1$ to $a_2$, and a third gain for all firing angles in excess of $a_2$.

To implement this gain characteristic, it is only necessary to provide as hardware a digital amplifier which has the following specifications:

For $a \leq a_1$, Gain $= Ka$ for $a_1 < a < a_2$, Gain $= K\left(a_1 + \frac{a-a_1}{n_1}\right)$ and for $a \geq a_2$, Gain $= K\left(a_1 + \frac{a-a_1}{n_1} + \frac{a-a_2}{n_2}\right)$.

In most applications, the $a_1$ and $a_2$ points can be chosen such that the scaling factors $n_1$ and $n_2$, are powers of 2; this facilitates system implementation.

Figure 3B:
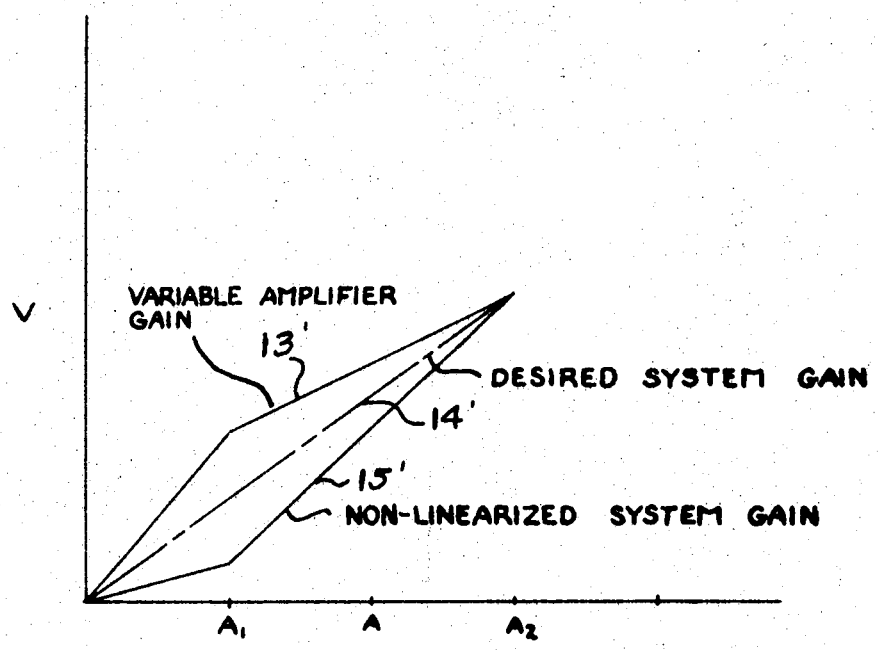

FIG. 3b shows a similar but somewhat simplified approach to the same problem indicated in FIG. 3a. If the actual firing angles required in a particular control system are less than $a_2$, then it is only necessary to compensate for the nonlinearities existing in the region from 0 to $a_2$. The linear approximation of this nonlinearity under these conditions is illustrated by curve 13' and the desired system gain is the linear relationship shown by curve 14'. To compensate for this nonlinearity and arrive at the desired system gain, the gain of the variable amplifier need only follow the two slope curve indicated at 15'. Hence, the characteristics of the variable amplifier are such that for all firing angles less than $a_1$, it has a first gain characteristic and for any firing angle in excess of $a_1$, a second gain characteristic. Note that the relationship shown in FIG. 3b assumes that the firing angle will never be greater than $a_2$.

The actual magnitude of the gain differences shown in FIGS. 3a and 3b depend, of course, upon the particular apparatus involved and may vary from application to application. Broadly stated, the present invention contemplates the use of appropriate digital apparatus which will perform the necessary arithmetic operations.

Figure 4:
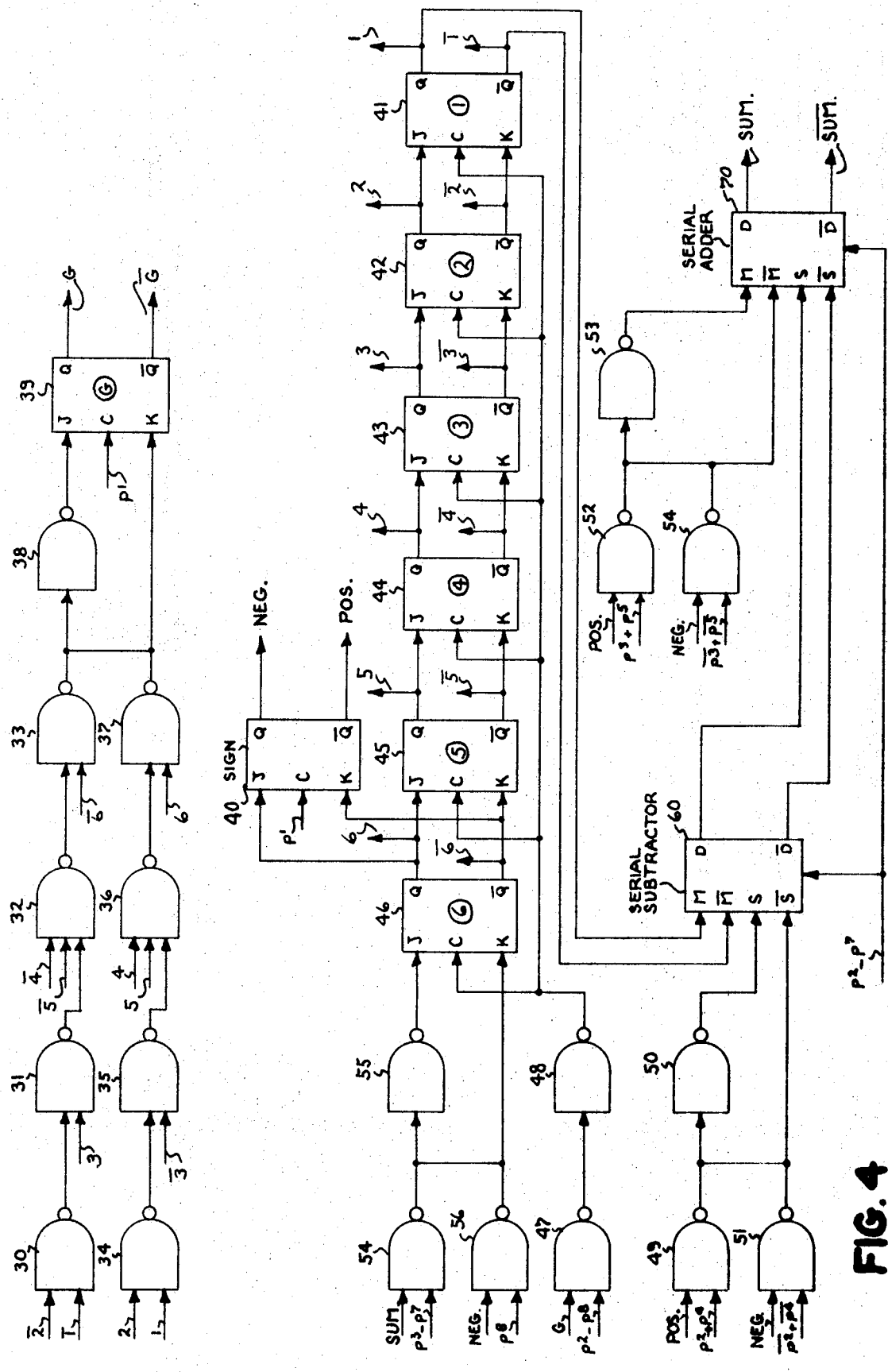
FIG. 4 a detailed logic diagram of a preferred embodiment of the variable gain digital amplifier shown in FIG. 1.

A simple illustration of one system which provides the necessary variable gain is shown in FIG. 4. Before turning to a specific explanation of the system of FIG. 4, it should first be noted that certain applications have shown a nonlinearity whereby the slope of the gain curve in the second interval (FIG. 3b) has a dividing factor which is some power of 2. That is to say, gain is defined, in general, by the relationship: if $a \leq a_1$ then Gain $= ka$;

if $a > a_1$ then Gain $= Ka_1 + \frac{K}{X}(a - a_1)$ where the dividing factor $X =$ some power of 2. For such a relationship, the variable amplifier can be implemented according to the system shown in FIG. 4.

THE NUMBER SYSTEM

The embodiment of the variable gain amplifier shown in FIG. 4 operates from both negative and positive inputs. The digital error signal is in binary notation, but any two-bit code could be used with minor modifications in the logic circuitry. For the purposes of explaining the present embodiment, the digital error signal is assumed to be a five-bit pure binary number with a sixth (most significant) bit being used to represent the sign of the data.

For positive errors, the error signal indicates the magnitude of the error in pure binary with the sign bit being a 0 to indicate a positive error.

For negative error signals, the sign bit is a 1 and the magnitude of the error is coded in the so-called two's complement. That is, a negative number is obtained by beginning with a positive number of corresponding magnitude and substituting 1's for 0's and 0's for 1's.

The following examples serve to illustrate the coding of the digital error signals which are used in the present embodiment:

+5=000101
−5=111010.

THE LOGIC ELEMENTS

The variable gain digital amplifier of FIG. 4 operates with NAND logic. While NAND logic is used in the particular embodiment shown, it will be obvious to those skilled in the art that any type of logic system, either positive or negative would suffice equally well.

The logic element designated at 30 is a simple NAND gate. This gate operates in the following fashion—when all of the inputs (indicated by arrows) assume a logic "1" state, the output (denoted by the circle) assumes a logic "0" state. Under any other condition, the output is a logic "1." This type of operation is true regardless of the number of inputs provided on a particular NAND gate.

In addition, any number of NAND gates may be tied together at their outputs to accomplish what is normally referred to as an OR function. That is, if two or more NAND gates have their outputs tied together, these outputs will assume a logic "0" state when all of the inputs on any one gate assume a logic "1" state. By way of example, gates 33 and 37 in FIG. 4 have their outputs tied together. If both of the inputs to gate 33 are logic "1" then the output of gate 33 (and therefore the output of gate 37) will be a logic "0" or if both of the inputs of gate 37 are a logic "1" then the output of gate 37 (and therefore the output of gate 33) will be a logic "0."

The logic element denoted at 40 is a conventional J-K flip-flop, It has three inputs labeled J, C, and K and two outputs labeled Q and $\overline{Q}$. The input labeled J is referred to as the set steering terminal, the input labeled K is the reset steering terminal and the input labeled C is the common trigger terminal. The presence of a logic "1" at the set steering terminal J, followed by a trigger signal at the common trigger terminal C causes the flip-flop to assume the set state. A trigger signal is defined as a signal which goes from logic "1" to logic "0." The flip-flop changes from one state to the other when the steering signal is present on the appropriate steering terminal before a trigger signal is received at the common trigger input. Similarly, the presence of a logic "1," at the reset steering terminal K, followed by a trigger at the common trigger terminal C, causes the flip-flop to assume its reset state. The two output terminals Q and $\overline{Q}$, indicate the logic signal present at that terminal when the flip-flop is in the set state. That is, if flip-flop 40 is set, the output terminal Q is a logic "1" and logic terminal $\overline{Q}$ is a logic "0."

The logic element denoted at 60 is a one-bit serial subtractor. It has four inputs; the M and $\overline{M}$ input terminals for the minuend, and the S and $\overline{S}$ terminals for the subtrahend. The two output terminals, labeled D and $\overline{D}$ reflect the difference which results from performing, on a bit-by-bit basis, pure binary subtraction of the subtrahend from the mimuend. Such a serial subtractor generally comprises a plurality of logic elements to perform the necessary one-bit subtraction including the storage and routing of borrows. During subtraction, the output difference, on a bit-by-bit basis, appears essentially simultaneously with the presentation of the minuend and subtrahend at the inputs. From the standpoint of the present embodiment, it is assumed that there is no time delay in the serial Finally, the logic element denoted 70 in FIG. 4 is a one-bit serial adder. It has four inputs, the M and $\overline{M}$ for the augend, and the S and $\overline{S}$ terminals for the addend. The one-bit serial adder 70 operates to perform a bit-by-bit binary addition of the two binary numbers presented at the added augend input terminals and, essentially without any time delay, present the sum at its output terminals.

Since the logic structure of binary adders and subtractors are well known in the art and form no part of the present invention, it suffices to explain their operation without further use of detailed logic diagrams. For the embodiment of the invention, shown in FIG. 4 any type of one-bit serial adder or subtractor of the various types known in the art can be used provided they have the operational characteristics outlined above. Other embodiments of the variable gain amplifier could use parallel adders and substractors.

OPERATION OF The VARIABLE GAIN DIGITAL AMPLIFIER

Suppose that it is found desirably, in a particular application to have the following gain characteristic:

$$\text{for } a \leq 5, \text{ Gain} = Ka;$$
$$\text{for } a > 5, \text{ Gain} = K\left[5 + \left(\frac{a-5}{2}\right)\right]$$

The embodiment shown in FIG. 4 will operate in order to provide this particular gain curve in order to compensate for the predetermined nonlinearity resulting from operation with a sinusoidal input. Before turning to the specific digital apparatus used, the system operation will be explained in terms of a series of steps;

1. Load the output of the digital error generator 4 of FIG. 1 into the six-bit shift register composed of flip-flops 41–46.
2. Examine the number in the shift register to see if it is greater than 4.
3. If the number is 4 or less, it is unnecessary to make any modification and operation ceases at this point.
4. If the number is greater than 4, it is shifted through a serial subtractor 60 where 5 is subtracted from it.
5. The output of the serial subtractor 60 is shifted one bit, (thereby effecting a division by 2 since the numbers are coded in binary) and then fed into the serial adder 70 where 5 is added to it. 6. The output of the serial adder is shifted back into flip-flops 41–46.

For the purposes of explaining the operation of the variable gain digital amplifier of FIG. 4, it will be necessary to divide the operational sequence into a series of discrete time increments. These discrete time signals, which may comprise a series of time-spaced electrical pulses, are denoted in the logic diagram of FIG. 4 as the $p$ (for pulse) signals. The number following the letter $p$ indicates the position in the time sequence at which this particular pulse occurs. Hence, $p1$ is the first pulse in the sequence of pulses which sequence the operation of the system shown in FIG. 4.

The first step in the operation is, as outlined above, the loading of the output of the digital error generator 4 of FIG 1 into the six-bit shift register composed of flip-flops 41–46. The method of loading the error into the shift register forms no part of the present invention but it suffices to say that the error may be either shifted into the shift register in serial fashion or, alternatively, loaded into the shift register in parallel. The method of loading used is immaterial since it is only necessary that the error signal be loaded into the shift register prior to $p1$ time.

After the digital error signal is loaded into the shift register, the information in flip-flops 41–45 indicates the magnitude of the error in five-bit binary notation, either in pure binary for positive numbers or in two's complement if the error is negative. The least significant digit is loaded into flip-flop 41 and digits of ascending significance are loaded into the remaining flip-flops 42–45. Flip-flop 46 contains the sign bit which, as was pointed out above, will be a 0 (flip-flop 46 reset) for positive errors and a 1 (flip-flop 46 set) for negative errors.

At the first pulse, $p1$, in the time sequence, the second step in the operation described above takes place. Actually, two things take place simultaneously. First, the sign bit located in flip-flop 46 is loaded into flip-flop 40 by virtue of the fact that the outputs of the flip-flop 46 are connected to the steering terminals of flip-flop 40 and the trigger of flip-flop 40 is energized by $p1$.

In addition, the contents of the shift register are examined to ascertain whether the number contained therein is greater than 4. If the error stored in the shift register is greater than 4, then flip-flop 39, labeled "$G$," will be set. Recalling the operational characteristics of a J-K flip-flop, it is clear that flip-flop 39 will set at $p1$ if the J input is a logic "1" and K input is a logic "0." This will be true only if the inputs to either gate 33 or gate 37 are both logic "1."

Gate 33 is activated to detect positive numbers in excess of 4(00100) by virtue of the signal $\bar{6}$ from flip-flop 46 as one of its inputs. It is clear that whether a positive number stored in the shift register is greater than 4 is determined by the Boolean relationship:

$G = 5 + 4 + [3 + (1+2)]$ where $5 = Q$ output of flip-flop 45, $4 = Z$ output of flip-flop 44, etc. This relationship is mechanized by gates 30, 31 and 32. Hence, if the output of gate 32 is a logic "1" then the number stored, if positive, is greater than 4. Since the output of gate 32 forms the second input to gate 33, the output of gate 33 will be a logic "0." Since the output of gate 33 is connected directly to the K terminal of flip-flop 39 and is fed through inverter 38 to the J input, flip-flop 39 will set at $p1$.

Similarly, for negative numbers, the signal 6 from flip-flop 46 activates gate 37. Negative numbers in two's complement notation having a valve greater than 4 are defined as:

$G = \bar{5} + \bar{4} + [3 \cdot (\bar{1} + \bar{2})]$ where $\bar{5} = \bar{Q}$ output of flip-flop 45, $\bar{4} = \bar{Q}$ output of flip-flop 44, etc. This Boolean relationship is mechanized by gates 34, 35, and 36.

After having examined the contents of the shift register composed of flip-flops 41–46, the flip-flop 39 will set if and only if the number stored in the shift register is greater than 4. If flip-flop 39 does not set, indicating that the number stored is 4 or less, then operation ceases at this point since it is unnecessary to make any modification in the output of the digital error generator. If, on the other hand, the number stored in the shift register is greater than 4 then flip-flop 39, as explained above, will set. This causes the signal G to become a logic "1" thereby activating gate 47 which has as its other input the pulse signals $p2$ through $p8$. The output of gate 47 is inverted by inverter 48 whose output is a series of pulses $p2$ through $p8$ and is connected to the clock terminals of flip-flops 41 through 46 so that the contents of the shift register are serially shifted and form one input to the serial subtractor 60.

If the number initially stored in the shift register was a positive number, gate 49 is activated by a signal POS, from flip-flop 40. The output of gate 49 goes to logic "0" at $p2$ and $p4$ times by virtue of the signal $p2 + p4$ on its outer input. This output is fed directly to the $\overline{S}$ input of serial subtractor 60 and is inverted by inverter 50 whose output then represents the number 5 (000101) in six-bit binary notation and is fed to the S input of serial subtractor 60. By the same token, if the number in shift register was negative, the gate 51 will be activated by virtue of the signal NEG. on one input. Its output will go to logic "1" at $p2$ and $p4$ times by virtue of the signal $\overline{p2+p4}$ on its outer input. This output is similarly relayed to the $\overline{S}$ terminal and inverted via inverter 50 before being fed to the S terminal. Hence, subtractor 60 acts to subtract 5, in either positive or negative notion, from the errors stored in the shift register. The result of the subtraction in serial subtractor 60 is indicated on a bit-by-bit basis on its output terminals D and $\overline{D}$ and is fed into the S and $\overline{S}$ inputs of the serial adder 70. Once again, if the original number stored was positive, gate 52 is activated by signal POS. and its output goes to logic "0" during ]$p3$ and $p5$ times by virtue of the presence of the signal $p3+p5$ at its other input. This signal is fed to the $\overline{M}$ input of the serial adder 70 and is inverted by inverter 53 and fed to the M input of serial subtractor 70. The result of this signal is to generate the number 5(00101) delayed by one bit from the timing of the original signal. Hence, the serial adder 70 operates to add 5 to the output of the serial subtractor 60 but the output of serial subtractor 60 is effectively advanced by one binary bit, thereby effecting a division by 2 as required by the gain characteristic set forth above.

Similarly, if the number in the shift register was originally negative, gate 54 is activated by virtue of the signal NEG. at one of its inputs so that its output goes to logic "1" during $p3$ and $p5$ times by virtue of the signal $\overline{p3+p5}$ on its other input. This has the effect of adding the number 5 in two's complement form (11010). Accordingly, the output of serial adder 70 under these conditions equals 5 plus the difference (between the original number stored and 5) divided by 2. This output, indicated by the signals SUM and $\overline{\text{SUM}}$ indicate the correction required in order to compensate for the inherent nonlinearity in the system.

The output of serial adder 70 is fed back into the shift register 41–46 by virtue of the fact that signal SUM forms one input to gate 54 and allows the output of serial adder 70 to be shifted back into the shift register from $p3$ to $p7$ times. Finally, if the original number stored were negative, the signal NEG. on gate 56, in conjunction with $p8$, operates to restore the sign bit in flip-flop 46 to a logic "1" which was the original sign indicative of a negative number.

At this point it is obvious that the gain characteristic set forth above has been carried out by the manipulations in the variable gain digital amplifier of FIg. 4 and the contents of the shift register 41–46 can now be relayed to appropriate circuitry in the power amplifier wherein it can be used to directly control the conduction of the AC source. If, for example, the power amplifier comprises controllable rectifiers and their appropriate firing circuits, the contents of the shift register 41–46 will be transferred into some type of digital firing circuit and used therein to directly control the firing angle at which the controllable rectifiers are initiated into conduction.

Although the invention has been described with respect to a particular embodiment, the principles underlining this invention will suggest many additional modification of this particular embodiment to those skilled in the art. Therefore, it is intended that the appended claims shall not be limited to the specific embodiments described but rather shall cover all such modifications as fall within the true spirit and scope of the invention.

What I claim as new and desire to secure by Letters Patents of the Unites States Is:

1. A digital control system for controlling the transfer of power from an AC source having an inherently nonlinear power transfer characteristic to a load comprising:
  a. a phase controlled power amplifier connected between the AC source and the load and operative to initiate the flow of power from the source to the load;
  b. a digital error generator and;
  c. a variably gain digital amplifier connected between said digital error generator and said power amplifier, the gain of said digital amplifier varying in response to at least one preselected output of said digital error generator by an amount which causes the amplified output of said digital error generator to substantially linearize the transfer of power by said power amplifier from the AC source to the load.

2. The digital control system recited in claim 1 which includes a dynamoelectric machine as a load and wherein said power amplifier comprises a plurality of controllable rectifiers and associated firing circuits.

3. A digital control system recited in claim 2 which receives power from a sinusoidal AC source and wherein the gain of said digital amplifier is reduced in response to a first output of said digital error generator corresponding to a first firing phase angle of said controllable rectifiers and the gain of said digital amplifier is increased in response to a second output of said digital error generator which corresponds to a second firing phase angle of said controllable rectifiers which occurs later in a half-cycle of the sinusoidal source than the first phase angle.

4. The digital control system recited in claim 1 wherein said variable gain digital amplifier comprises:
  a. storage means for storing an $m$ bit digital input signal where $m$ is an integer;
  b. comparison means operatively connected to said storage means for determining whether the stored signal exceeds $(n-1)$ where $n$ is a predetermined number;
  c. means for subtracting $n$ from the contents of said storage means whenever the contents exceed $(n-1)$; and
  d. a serial digital adder arranged to add $n$ to the last $q$ bits of the output of said subtractor, where $q$ is a number less than $m$.

5. The digital control system recited in claim 4 which includes a dynamoelectric machine as a load and wherein said power amplifier comprises a plurality of controllable rectifiers and associated firing circuits.

6. A digital control system recited in claim 5 which receives power from a sinusoidal AC source and wherein the gain of said digital amplifier is reduced in response to a first output of said digital error generator corresponding to a first firing phase angle of said controllable rectifiers and the gain of said digital amplifier is increased in response to a second output of said digital error generator which corresponds to a second firing phase angle of said controllable rectifiers which occurs later in a half-cycle of the sinusoidal source than the first phase angle.

7. A digital control system for controlling the flow of power from a machine AC source to a load comprising:
  a. a two digital error generator whose first input received a digital input command signal;
  b. a variable gain digital amplifier operatively connected to the output of said digital error generator, the gain of said digital amplifier varying in response to at least one preselected output of said digital error generator so as to change the output signals of said digital error generator by an amount which compensates for the inherent nonlinearities of the AC source and thereby substantially linearizes the transfer of power from the AC source to the load;
  c. a power amplifier and a load, said power amplifier operatively connecting the output of said variable gain amplifier to said load so that the power transferred from the AC source to said load is directly controlled; and
  d. digital feedback means coupled to said load and responsive to a preselected characteristic of said load, the output of said digital feedback means forming the second input of said digital error generator.

8. A control system as recited in claim 7 which further comprises a two input summing point connected between said variable gain amplifier and said power amplifier, the first input being connected to the output of said variable gain amplifier and the second input being connected to the output of a feedback device which is connected to said load and responsive to a preselected characteristic of said load.

9. A variable gain digital amplifier comprising:
  a. storage means for storing an $m$ bit digital input signal, where $m$ is an integer;
  b. comparison means operatively connected to said storage means for determining whether the stored signal exceeds $(n-1)$ where $n$ is a predetermined number;
  c. means for subtracting $n$ from the contents of said storage means whenever the contents exceed $(n-1)$; and
  d. means for adding $n$ to the last $q$ bits of the output of said subtractor where $q$ is a number less than $m$.

10. The variable gain digital amplifier recited in claim 9 wherein said means for subtracting comprises a serial subtractor and said means for adding comprises a serial adder.

11. The variable gain digital amplifier according to claim 9 wherein said storage means comprises a shift register.

12. The method of controlling the transfer of power from an AC source to a load with a power amplifier connected between the AC source and the load comprising the steps of:
   a. generating a digital error signal;
   b. loading the generated error signal into storage means having the capacity for storing an $m$ bit digital input signal, where $m$ is an integer;
   c. examining the storage means to see if its contents exceed $(n-1)$ where $n$ is a predetermined number;
   d. shifting the contents of the storage means into a subtractor where $n$ is subtracted from the contents;
   e. relaying the output of the subtractor to an adder wherein $n$ is added to the last $q$ bits of the output of the subtractor where $q$ is an integer less than $m$; and
   f. feeding the result of the addition directly to the power amplifier to control the magnitude of power which is transferred from the AC source to the load.

13. The method of controlling the transfer of power from an AC source to a load as set forth in claim 12 comprising the additional step, following step (e) and prior to step (f), of shifting the output of the adder back into the storage means.

PO-1050
(5/69)

United States Patent Office
CERTIFICATE OF CORRECTION

Patent No. 3,614,571          Dated October 19, 1971

Inventor(s) Albert E. Koch

It is certified that error appears in the above-identified patent and that said Letters Patent are hereby corrected as shown below:

Column 7, line 60 -- ; -- should be inserted after the word "generator" and omitted at the end of the line so that this line reads as follows:

"b. a digital error generator; and"

Column 7, line 61 "variably" should be corrected to -- variable -- so that this line reads as follows:

"c. a variable gain digital amplifier connected between said"

Column 8, line 35 "machine" should be deleted and -- sinusoidal -- inserted in its place so that this line reads as follows:

"from a sinusoidal AC source to a load comprising:"

Column 8, line 37 -- input -- should be inserted between "two" and "digital" so that this line reads as follows:

"a. a two input digital error generator whose first input received a"

Signed and sealed this 25th day of April 1972.

(SEAL)
Attest:

EDWARD M. FLETCHER, JR.
Attesting Officer

ROBERT GOTTSCHALK
Commissioner of Patents